US008700811B2

(12) United States Patent
Oshins et al.

(10) Patent No.: US 8,700,811 B2
(45) Date of Patent: Apr. 15, 2014

(54) VIRTUAL MACHINE I/O MULTIPATH CONFIGURATION

(75) Inventors: Jacob Oshins, Redmond, WA (US); Tejas Karandakar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 12/787,255

(22) Filed: May 25, 2010

(65) Prior Publication Data

US 2011/0296234 A1    Dec. 1, 2011

(51) Int. Cl.
G06F 3/00 (2006.01)
G06F 9/455 (2006.01)

(52) U.S. Cl.
USPC ..................... 710/8; 710/36; 718/1

(58) Field of Classification Search
None
See application file for complete search history.

(56) References Cited

U.S. PATENT DOCUMENTS

| | | | | |
|---|---|---|---|---|
| 6,941,390 | B2 * | 9/2005 | Odom | 710/22 |
| 7,523,286 | B2 | 4/2009 | Ramany et al. | |
| 2009/0133016 | A1 | 5/2009 | Brown | |
| 2009/0172666 | A1 | 7/2009 | Yahalom | |
| 2010/0054260 | A1 | 3/2010 | Pandey | |
| 2010/0146170 | A1 * | 6/2010 | Brown et al. | 710/105 |
| 2010/0290472 | A1 * | 11/2010 | Raman et al. | 370/395.2 |
| 2011/0258480 | A1 * | 10/2011 | Young et al. | 714/2 |

OTHER PUBLICATIONS

"A Platform Built for Server Virtualization: Cisco Unified Computing System", Accessed on Mar. 25, 2010, 7 pages http://www.ciscorouters.biz/en/US/prod/collateral/ps10265/ps10276/white_paper_c11-555663_ps10280_Products_White_Paper.html.
"High Availability with VMware vSphere and Emulex/Cisco SANs", Oct. 2009, 11 pages, http://www.ciscofinancing.com/en/US/prod/collateral/ps4159/ps6409/ps4358/white_paper_availability.
"Redundancy Configuration using Virtual Fibre Channel Adapters", Accessed on Mar. 25, 2010, 4 pages http://publib.boulder.ibm.com/infocenter/powersys/v3r1m5/index.jsp?topic=/p7hb1/iphb1_vios_mpio_npiv.htm.
"Virtualizing SAN Connectivity with VMware Infrastructure 3 and Brocade Data Center Fabric Services", Brocade, VMware, Accessed on Mar. 25, 2010, 15 pages http://www.brocade.com/downloads/documents/technical_briefs/VMware-BRCD_Virtualizing_SAN_Connectivity_GA-TB-084-00.pdf.

* cited by examiner

Primary Examiner — Idriss N Alrobaye
Assistant Examiner — Richard B Franklin
(74) Attorney, Agent, or Firm — Tony Azure; Andrew Sanders; Micky Minhas (57) ABSTRACT

Disclosed are methods for exposing multiple interfaces of a communications fabric (Ethernet, FiberChannel, Serial-Attached-SCSI, Infiniband, etc.) of a virtual machine and automatically mapping those interfaces onto separate physical interfaces. Such an approach may preserve the simple management experience of a single connection point into the virtual machine while allowing the OS and application within the virtual machine to supply information necessary to efficiently use the multiply underlying physical links.

20 Claims, 5 Drawing Sheets

VIRTUAL MACHINE I/O MULTIPATH CONFIGURATION

BACKGROUND

When a guest computer system is emulated on a host computer system, the guest computer system is called a "virtual machine" as the guest computer system only exists in the host computer system as a software representation of the operation of one specific hardware configuration that may diverge from the native machine. The virtual machine presents to the software operating on the virtual machine an emulated hardware configuration.

A virtual machine management system (sometimes referred to as a virtual machine monitor, virtualization system, or a hypervisor) is also often employed to manage one or more virtual machines so that multiple virtual machines can run on a single computing device concurrently. The virtual machine management system runs directly on the native hardware and virtualizes the resources of the machine by exposing interfaces to virtual machines for access to the underlying hardware. A host operating system (OS) and a virtual machine management system may run side-by-side on the same physical hardware. For purposes of clarity will we use the term virtualization system to refer to all incarnations of a virtual machine management system.

One problem that occurs in the operating system virtualization context relates to computing resources such as data storage devices, data input and output devices, networking devices and the like, which we refer to collectively as input/output (I/O). Existing virtualization solutions tend to handle physical redundancy of I/O by managing that redundancy in the virtualization system, away from the guest operating system, and presenting a virtualized, single I/O channel (network interface, storage host bus adapter, etc.) to the virtual machine. This limits the ability of the OS and application within the virtual machine to provide useful hints regarding how to effectively manage multiple path scenarios.

SUMMARY

The embodiments described allow for exposing multiple interfaces of a communications fabric (Ethernet, FibreChannel, Serial-Attached-SCSI, Infiniband, etc.) to a virtual machine and automatically mapping those interfaces onto separate physical interfaces. Such an approach may preserve the simple management experience of a single connection point into the virtual machine while allowing the OS and application within the virtual machine to supply any information necessary to efficiently use the multiply underlying physical links.

To that end, input/output (I/O) configuration information for the virtual machine may be received and, based on the I/O configuration information, I/O channels associated with the virtual machine may be determined and the I/O channels grouped into logical sets. Each logical set comprises I/O channels attached to the same virtual endpoint. For each logical set, each I/O channel may be mapped to a physical channel such that no two channels in a logical set are connected to the same physical channel. Each logical set of channels may be represented to the virtual machine as a single configuration entity such that the operating system of the virtual machine is allowed to expose I/O routing information to the attached virtual endpoint.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different combinations similar to the ones described in this document, in conjunction with other present or future technologies.

Figure 1:
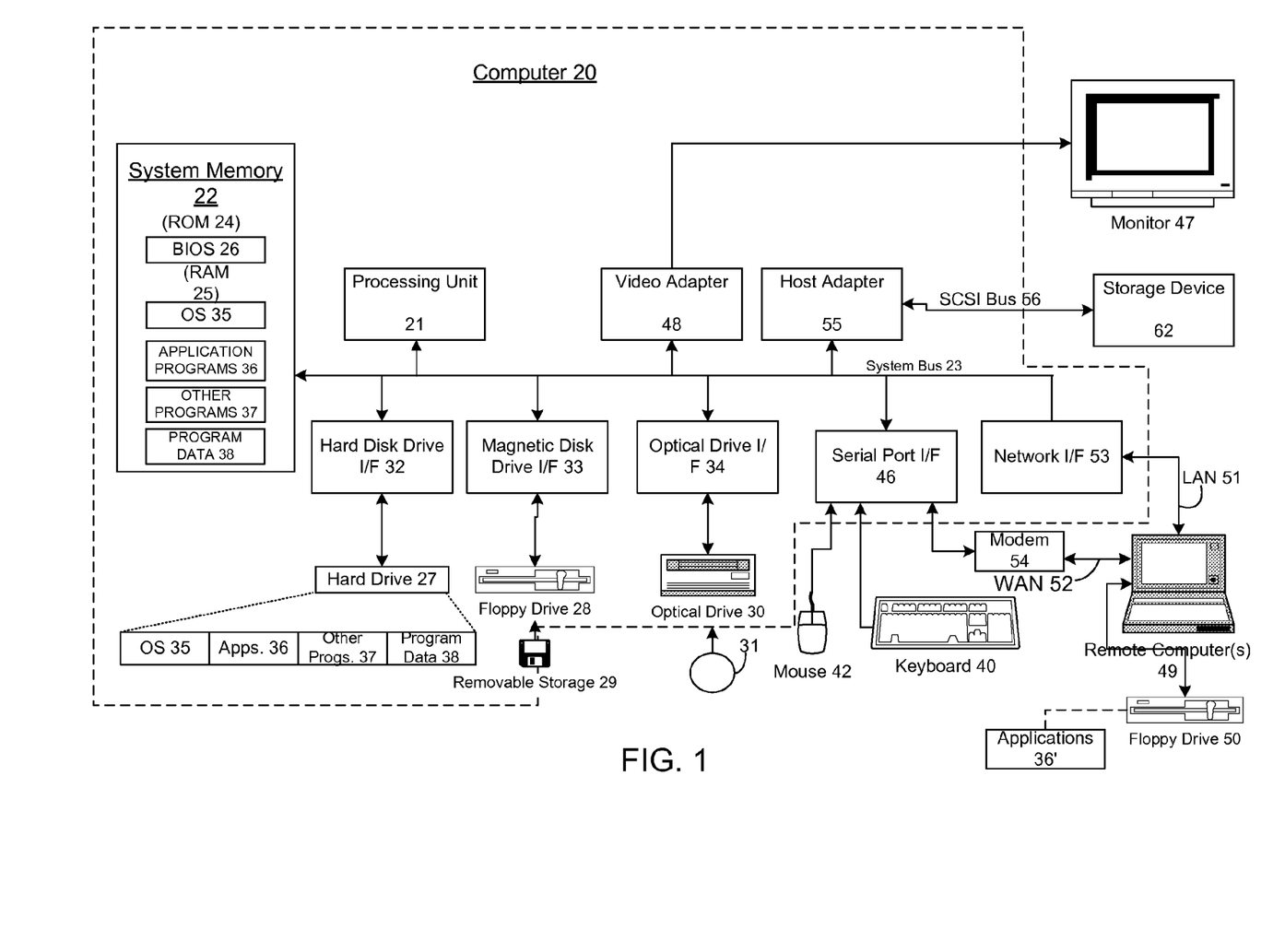
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computing device, such as a client workstation or a server. Generally, program modules include routines, programs, objects, components, data structures and the like that perform particular tasks. Those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Referring now to FIG. 1, an exemplary general purpose computing system is depicted. The general purpose computing system can include a conventional computer 20 or the like, including at least one processor or processing unit 21, a system memory 22, and a system bus 23 that communicative couples various system components including the system memory to the processing unit 21 when the system is in an operational state. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as flash memory cards, digital video disks, random access memories (RAMs), read only memories (ROMs) and the like may also be used in the exemplary operating environment. Generally, such computer readable storage media can be used in some embodiments to store processor executable instructions embodying aspects of the present disclosure.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37 and program data 38. Upon execution by the processing unit, the computer-readable instructions cause the actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
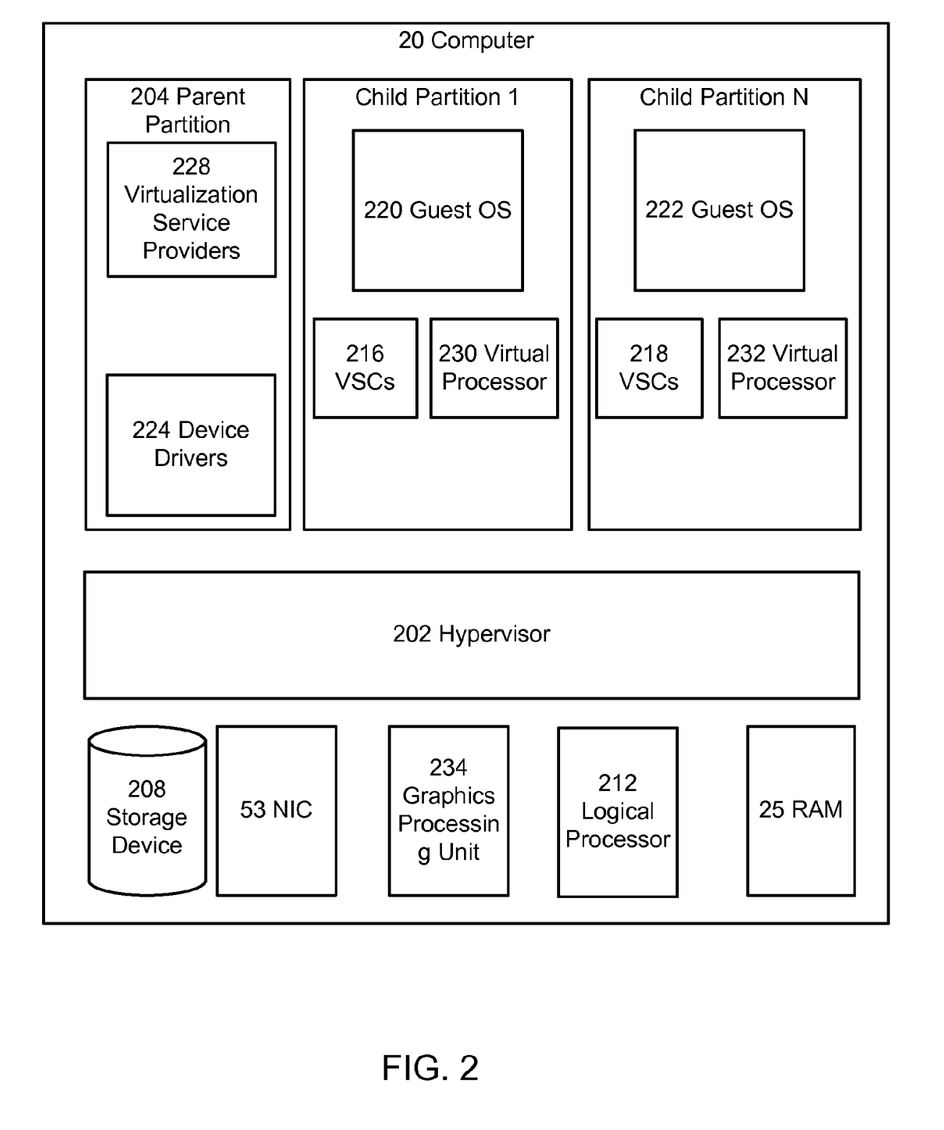
FIG. 2 illustrates a virtualized computing system environment.

Referring now to FIG. 2, depicted is a high level block diagram of computer systems that can be used in embodiments of the present disclosure. As shown by the figure, computer 20 (e.g., computer system described above) can include physical hardware devices such as a storage device 208, e.g., a hard drive (such as 27 in FIG. 1), a network interface controller (NIC) 53, a graphics processing unit 234 (such as would accompany video adapter 48 from FIG. 1), at least one logical processor 212 (e.g., processing unit 21 from FIG. 1), random access memory (RAM) 25. One skilled in the art can appreciate that while one logical processor is illustrated, in other embodiments computer 20 may have multiple logical processors, e.g., multiple execution cores per processor and/or multiple processors that could each have multiple execution cores. Depicted is a hypervisor 202 that may also be referred to in the art as a virtual machine monitor or more generally as a virtual machine manager or virtualization system. The hypervisor 202 in the depicted embodiment includes executable instructions for controlling and arbitrating access to the hardware of computer 20. Broadly, the hypervisor 202 can generate execution environments called partitions such as child partition 1 through child partition N (where N is an integer greater than 1). As used herein, a child partition may also be referred to as a guest partition or guest virtual machine. In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition. In embodiments the hypervisor 202 can be a stand-alone software product, a part of an operating system, embedded within firmware of the motherboard, specialized integrated circuits, or a combination thereof.

In the depicted example configuration, the computer 20 may include a parent partition 204 that can be configured to provide resources to guest operating systems executing in the child partitions 1-N by using virtualization service providers 228 (VSPs). In other virtualization systems, the hypervisor or VMM may not include a parent partition and perform associated services such as I/O within either the hypervisor or a host OS. In this example architecture the parent partition 204 can gate access to the underlying hardware. Broadly, the VSPs 228 can be used to multiplex the interfaces to the hardware resources by way of virtualization service clients (VSCs). Each child partition can include a virtual processor such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, the combination of the virtual processors and various VSCs in a partition can be considered a virtual machine.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. Each guest operating system 220 through 222 can have associated file systems that can have applications stored thereon such as e-commerce servers, email servers, etc., and the guest operating systems themselves. The guest operating systems 220-222 can schedule threads to execute on the virtual processors 230-232 and instances of such applications can be effectuated.

Figure 3:
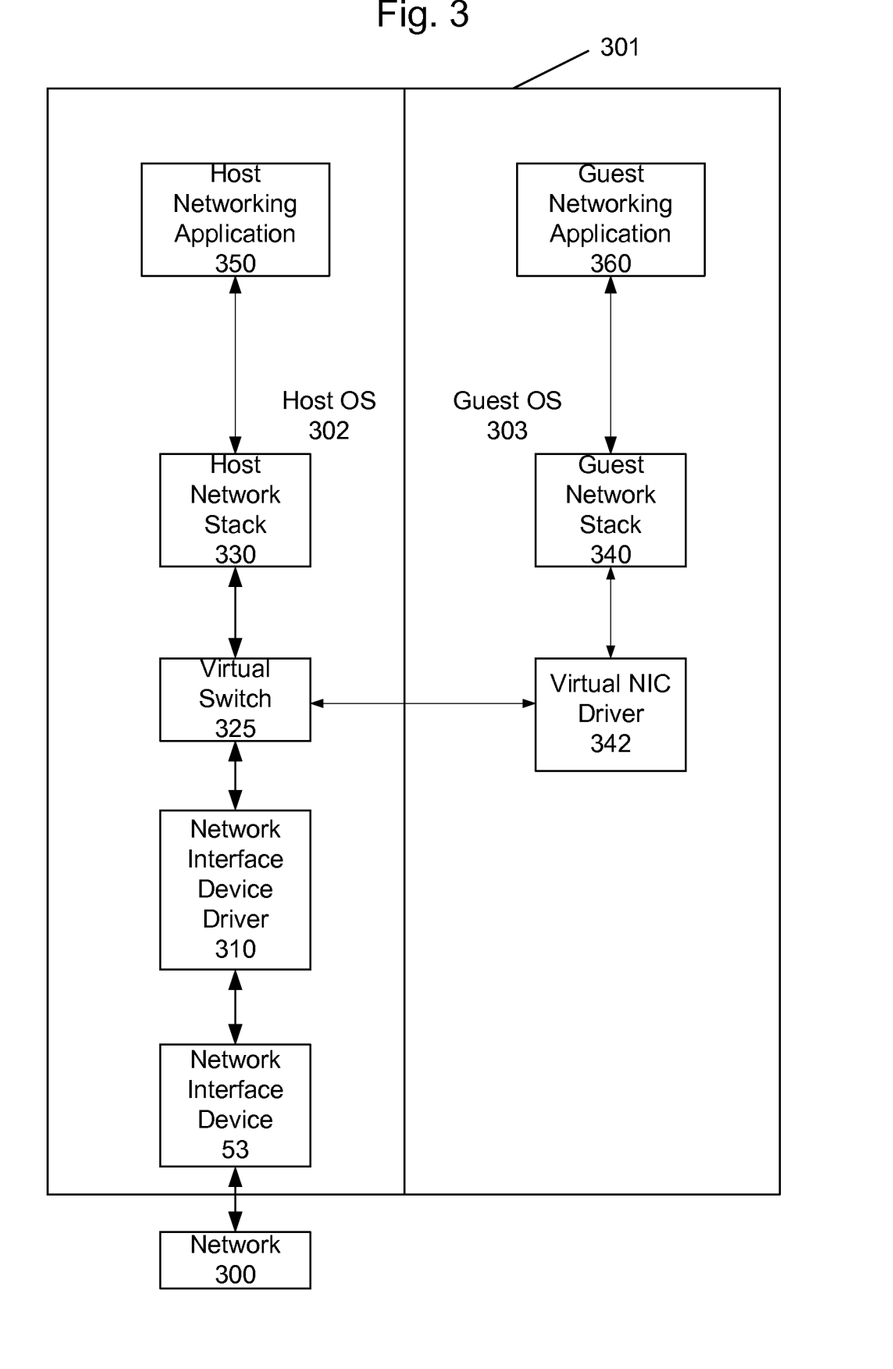
FIG. 3 illustrates the communication of networking across a virtualization boundary.

FIG. 3 is a block diagram representing an exemplary virtualized computing device where an operating system (host OS 302) controls the Network Interface Device 53.

Virtual Machine I/O Multipath Configuration

A switching fabric or communications fabric is a network topology where network nodes connect with each other via one or more network switches. In a Fibre Channel switched fabric, devices are connected to each other through one or more Fibre Channel switches. Fibre Channel is one network technology that can be used for attaching to storage area networks (SANs). A SAN is an architecture for attaching remote computer storage devices such that the devices appear as locally attached to the virtual machine InfiniBand is another switched fabric link that can also be used for the connection of virtual machines with high-speed peripherals such as storage disks. While the present disclosure is described in the context of one or more of such networking and storage implementations, it should be recognized that the disclosed concepts are not tied to any particular implementation.

Such network designs may employ two or more separate fabrics for redundancy. The fabrics may share the edge devices but are otherwise unconnected. By providing such redundancy, failover capability may be provided in which when one link fails, the second fabric may be used.

Existing machine virtualization solutions tend to handle physical redundancy of I/O by managing the redundancy in the hypervisor, away from the guest operating system, and presenting a virtualized, single I/O channel (network interface, storage host bus adapter, etc.) to the virtual machine. This may limit the ability of the OS and application within the virtual machine to provide useful hints about how to effectively manage multiple I/O paths.

These limits result from the fact that the hypervisor typically does not have the same information about the traffic as the guest OS on the virtual machine. When configuring and operating virtual machines, various pieces of information can be exposed to or hidden from the virtual machine. The amount of information to be hidden is often related to the desirability of relieving the virtual machine from participating in the details of various interfaces and protocols and thus avoiding increased complexity of the software running within the virtual machine. The information may be hidden by having the hypervisor deal with the details of the interfaces, and as a result, details regarding the data traveling through a particular data channel may necessarily be hidden.

For example, at one level in the case of TCP/IP over Ethernet, the guest OS may have, for example, information about which packets are part of specific TCP connections and thus information regarding which packets should travel over the same interface to avoid being re-ordered. In a different example and at another level, in the case of FibreChannel the guest OS can host plug-ins that can identify which interfaces at the storage target have the least queue depth. In each of these cases, the hypervisor acts primarily as an information conduit. In other words, the hypervisor is not examining the traffic (which is desirable to avoid complicating the hypervisor design and increasing cost). However, exposing only a single virtual interface to the virtual machine hides potentially useful information as described above.

It may thus be desirable in some cases to allow the inclusion of such information because the guest OS typically has more access to such information. The guest OS typically interacts with the application workload and is generally in a better position to provide hints as to how to best handle the I/O data. Thus, in the context of mapping I/O onto redundant physical media, an administrator may attempt to mitigate the above issues by manually configuring the virtual machine with multiple virtualized I/O channels such as virtual NICs and manually enabling multipath solutions in the guest OS. The administrator may also have to manually associate each virtual NIC with a distinct physical NIC that is the part of the same network. This can become very cumbersome with very large data centers, and when live migration is performed, the issues can become more exacerbated.

Disclosed herein are concepts for automatically configuring virtual machines to take advantage of multipath while avoiding the problems described above. In various embodiments, disclosed are methods, systems, and computer readable media products for exposing multiple interfaces to a communications fabric (Ethernet, FibreChannel, Serial-Attached-SCSI, Infiniband, and the like) to a virtual machine and then automatically mapping those interfaces onto separate physical interfaces. This approach preserves the simple management experience of a single connection point into the virtual machine while allowing the OS and applications within the virtual machine to provide information to efficiently use the multiple underlying physical links. In some embodiments, methods are disclosed for managing multiple paths to storage through networks. For example, multiple paths to Ethernet or Fibre Channel may be managed. TCP/IP travels over Ethernet, as a higher-layer protocol and we might use internal information at that layer, like TCP connection state, to choose a useful path. On Fibre Channel, where storage traffic is more typical, we might use guest-level Multi-Path I/O plug-ins to make path choices. Logically, though, this is a mix-and-match situation. We might be doing storage over Ethernet, as with iSCSI, at which point we'd use MPIO as the point of intelligent path choice. We might also run TCP/IP over Fibre Channel, though that's exceedingly rare. While the embodiments are described in the context of storage space, at least two layers are addressed. The first layer is handling the underlying network or fabric, creating virtual ports on the network or fabric, and managing traffic through those ports. The second layer is exposing networked storage in a way that various components in a guest OS which are aware of multiple paths to storage can use their local metrics (or other heuristics) to leverage the multiple paths.

Figure 4:
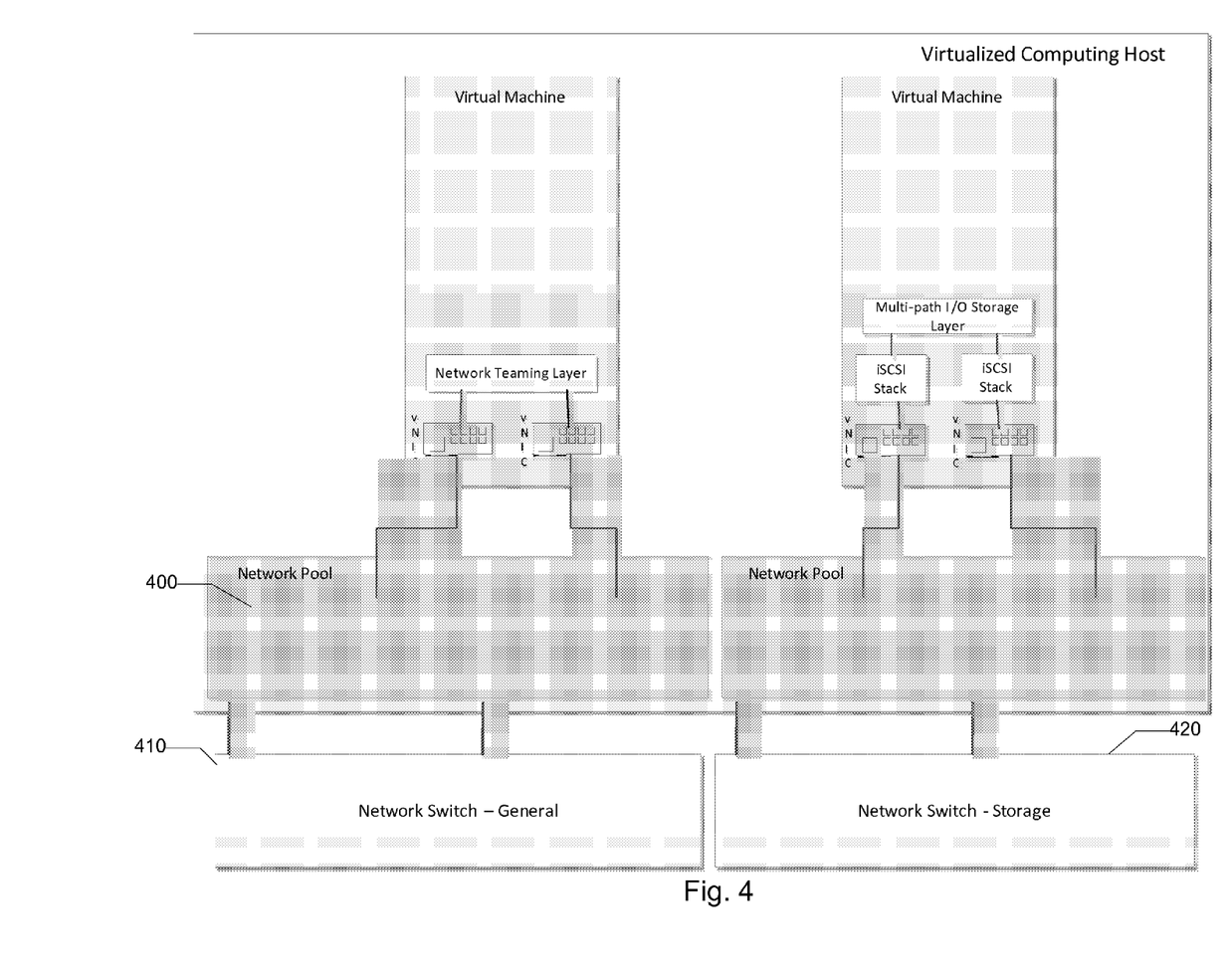
FIG. 4 illustrates a virtual machine environment including aspects of the invention.

FIG. 4 illustrates an exemplary context for further discussion. Illustrated are four Ethernet NICs 400. The Ethernet NICs 400 are attached to two network switches 410 and 420. Network switch 410 is dedicated to general networking traffic and network switch 420 is dedicated to storage traffic. In various embodiments, the switches may be FibreChannel, Infiniband, FibreChannel over Ethernet, or any other switching technology. The general purpose Ethernet switch may also be Infiniband or some other networking technology. A Host Bus Adapter (HBA) may connect a host system to other network and storage devices. A SCSI HBA connects a SCSi bus to a computing device. In Fibre Channel and InfiniBand, the HBA may refer to an interface card. A HBA may have a unique identifier such as a World Wide Name (WWN).

In one embodiment, redundant network interfaces (NICs, HBAs, etc.) may be grouped into resource pools where each physical resource in the pool is attached to the same logical Level 2 network. In one example embodiment, all of the NICs may be attached to the same network switch. In another example, the NICs may be attached to different physical switches, but those switches may be part of the same Level 2 network. In a further example, the switches may be part of multiple Level 2 networks, and the virtual switch ports that the virtual machine is attached to may be attached to one of those logical Level 2 networks that the switches are managing.

The resource pools may be configured automatically using various network switch protocols, by looking at default DNS suffixes, or by having the administrator or management suite "tag" the NICs as part of a specific resource pool.

As an illustrative example, two HBAs may be connected to one or more physical switches. The HBAs may be connected to the same switch if it is desired, for example, to double the amount of traffic that can be sent from the virtual machine. The HBAs may also be connected to separate switches if redundancy and/or fault tolerance is desired. As mentioned, each HBA has a unique identification such as a MAC address, WWN, or globally unique identifier (GUID). The unique identifier can be mapped onto the physical fabric so that traffic from a particular virtual port appears on the fabric as if it had a real HBA. In some cases the two HBAs can be attached to a virtual switch. Data traffic from the virtual machine may be sent to the virtual switch and a data path may be selected. Physical redundancy may thus be achieved by avoiding a single point of failure. For example, if a storage transaction fails, then the transaction can be restarted and sent via the other path. However, in this case useful information may be hidden. For example, the VMM/hypervisor/virtualization system may have information about the multiple paths, but may not have sufficient information to make useful choices about the paths. The virtualization system may thus not be able to intelligently select which path to use based on information that may be only contained within that virtual machine. The present disclosure address how to manage the multiple paths and usefully expose the paths to a guest OS.

In an embodiment, when configuring a virtual machine, it may be determined that a logical connection to a storage target is desired. For example, it may be determined that a Fibre Channel virtual port has been requested. The configuration preferences for the virtual port may then be determined. In the following discussion, virtual ports may generally be referred to as "interfaces." The configuration preferences may include the desired amount of redundancy. The level of redundancy may be determined at a number of levels and may include the desired fault tolerance and the desired number of data paths. Rather than managing the configuration as separate entities to be added and removed from the virtual machine, the resulting set of paths may be configured as a logical set that can be added and removed collectively. The logical set may comprise a redundancy level of at least two paths. In one embodiment a set of paths to a storage target can be configured as a single configuration entity rather than an entity that is added two or more times to the virtual machine. The logical set may be added to the virtual machine wherein a property of the set is the number of redundant paths.

As described in further detail below, an embodiment for addressing the above issues may include configuring logical sets of I/O channels for a virtual machine, each attached to the same Level 2 or Layer 2 network. This may comprise generating unique Level 2 addresses for each interface, such as the MAC, World-Wide-Name, etc. This may further comprise managing quality of service for the link set as a whole and configuring storage targets and other networking partners to respond to all of the interfaces. As used herein, the terms Level 2 network or Layer 2 network may generally refer to networks corresponding to Layer 2 of the OSI model. As is well known, Layer 2 may be implemented in various ways depending on the particular system or technology. For example, Layer 2 may correspond to the link layer of the TCP/IP model. In networks such as IEEE 802, Layer 2 may correspond to the Media Access Control (MAC) and Logical Link Control (LLC) sublayers. In Fibre Channel, Layer 2 may correspond to one or more of the physical layers including FC0, FC1, and FC2. As the term Layer 2 or Level 2 is used herein, the term is used generally to refer to all such networking layers and is not intended to be limited to a particular protocol or technology.

An embodiment of the present disclosure may further comprise mapping each I/O channel in a logical set to a physical channel and ensuring that no two members of the logical set are connected to the same channel. This may further comprise identifying the Layer 2 network that an I/O channel is intended to connect with and finding all the possible devices that provide connectivity with that network. An embodiment may further comprise creating an exclusivity rule that indicates that all the I/O channels in the set must map to separate physical interfaces. An embodiment may further comprise binding each I/O channel in the set to a separate valid physical interface.

As mentioned, when configuring the logical sets, the unique identifiers of physical devices may be determined. For example, the identifiers for HBAs may be determined. Once the identifiers are determined, the set of identifiers may be configured such that the storage target can view the set as a single entity and respond to the set in a consistent manner. For example, the relationship can be configured such that when any one of the set of identifiers is sent to the storage fabric, the storage target can provide access to a consistent storage location. In other words, a set of paths is built wherein the set includes redundant paths, and the set is delivered to the target as a single logical entity.

When path redundancy is desired, the resulting path configuration may provide path diversity such that the desired fault tolerance and/or increased bandwidth is achieved. Thus when configuring the logical sets, it is preferable that the user's intent be ascertained and that connections to the storage switches be allocated such that the logical fabric provides diverse paths to the target in accordance with the requested redundancy. For example, if a first HBA is linked to a first SAN and a second HBA is linked to a second SAN, then the fail-safe objectives for redundancy may not be achieved because each target only has one available path that is subject to a single point failure.

The specific configuration may depend on the actual physical network and available devices. Those skilled in the art will appreciate that policies for redundancy may be implemented at various levels of sophistication and may be applied at multiple system layers. For example, a policy may indicate that independent paths are desired but may not specify the specific switch port selection on external switches. Some policies may be more concerned with multiplying bandwidth than minimizing the probability of physical failure. In some cases switches may be used that internally have no single point of failure.

In an embodiment, the desired I/O path configuration may be determined and configured before instantiating the virtual machine. In the case of live migration, the desired I/O configuration information may be used to ensure that the migration target can support the configuration and desired policies. If the desired policy cannot be met then the system may nevertheless elect to continue. For example, if the desired level of redundancy cannot be provided, the migration may continue if allowed by the policy or by the administrator, with the caveat that one of the links into the virtual machine may be dropped.

Rather than representing the virtual machine configuration (internally and in the management interface) as a collection of separate virtual NICs, the NICs may be represented as a single logical connection with multiple paths to the network. Instead of, for example, a MAC address or World Wide Name, the NICs may be represented as an array of MAC addresses or World Wide Names. Each interface may be represented as a NIC within the virtual machine and each with a single MAC address or World Wide Name. The collection of the NICs, in any case, may be represented as a group. The association between I/O set and network is thus a single 1:1 relationship.

Each NIC may then be mapped onto a physical NIC (through a virtual networking switch) from the network resource pool that the I/O set is attached to. The virtualization system may use anti-affinity rules to ensure that no two virtual NICs are mapped onto the same physical NIC. If there are more virtual NICs in the I/O set than there are physical NICs in the network resource pool, then some of the virtual NICs may appear to be disconnected within the virtual machine. This keeps the virtual machine from drawing false inferences from the fiction that all of its NICs have separate paths to the network. Depending on the system policies, a virtualization host may allow a virtual machine to start successfully if the virtual NICs cannot all be mapped onto a physical NIC.

Representing the virtual machine configuration in this way may also be useful in selecting a suitable target machine for live migration. For example, a target machine that has the appropriate number of physical NIC's connected to the same Level 2 network may be considered an acceptable candidate for live migration. In the event that a candidate target machine with a fewer number of physical NIC's is selected, some virtual NIC's will appear disconnected after the virtual machine migration. Alternatively, the migration to such a machine may be disallowed via policy.

To further reduce the complexity of the virtual machine administrator tasks, various techniques may be applied to cause the OS within the virtual machine to automatically amalgamate multiple interfaces and spread traffic over the interfaces. An embodiment may comprise injecting software (also referred to as integration components) into the virtual machine which amalgamates the logical set of channels into a single interface for the virtual machine and such that the ability of the OS within the virtual machine to expose useful routing information is preserved. The integration components may comprise software components that include, among other things, virtualization drivers that assist the virtual machine in operating in a particular environment and may be loaded when setting up the virtual machine. The integration components may be configured such that the virtual machine administrator does not have to determine the intent or policies. Because the configuration of virtual ports (including information such as storage targets and multipath information) is contained within the virtual machine settings, the virtualization system can determine what type of configuration is appropriate for a guest OS and may automatically inject the integration components that set up the appropriate multipath I/O stack.

For example, in systems using OS's from multiple vendors, the BIOS or other firmware may be modified to expose iSCSI boot information. In another example where Windows™ is running in the virtual machine, network teaming drivers may be installed or Windows Multi-Path I/O drivers may be instantiated. In the example of iSCSI, this may comprise inserting tables in the BIOS/firmware to inform the booting OS which NICs were used for the iSCSI boot device.

More generally, the hypervisor/virtualization system can inject software that performs one or more of the above functions into the guest virtual machine. This can take the form of loading the software in the virtual machine at the time the virtual machine boots. Alternatively, other techniques may be used such as exposing a virtual CD-ROM image containing the useful software. Once the hypervisor-specific software is running within the virtual machine, the software can establish communication with the hypervisor and use the virtual machine configuration to drive the OS configuration.

Finally, an embodiment may comprise using a virtualization system to configure load balancing and failover or teaming networking systems within a guest operating system. In one embodiment, a method may comprise implementing failover capabilities in the parent partition. For example, in case of failure of a physical channel (such as a Fibre Channel Host Bus Adapter (HBA) port going offline), the logical channel that is associated with the physical channel would normally lose connectivity. However, if there is another unassigned physical port in the resource pool, the logical port can be reassigned to another physical channel in the same group on-the-fly, provided that the physical channel is not already assigned. During this process, the I/O from the virtual HBA can be queued in the parent partition, so that the guest OS never sees the virtual HBA going offline. In case no suitable physical channel is found, the logical channel may remain offline.

Figure 5:
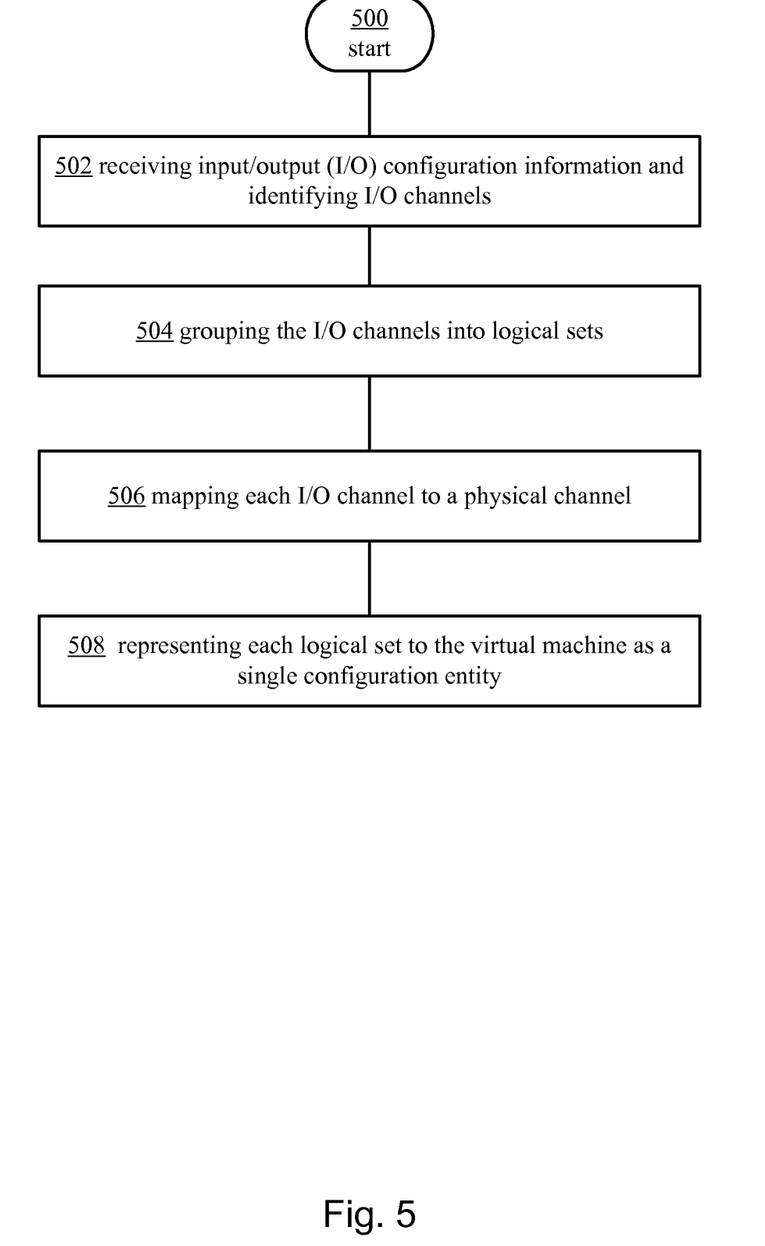
FIG. 5 is a flow diagram of the processing performed by a virtualization system according to an aspect of the invention.

FIG. 5 depicts an exemplary operational procedure for carrying out an embodiment of the disclosed subject matter. Referring to FIG. 5, operation 500 begins the operational procedure and operation 502 illustrates receiving input/output (I/O) configuration information for the virtual machine and, based on the I/O configuration information, identifying I/O channels associated with the virtual machine. In an embodiment, the I/O configuration information may comprise a desired level of path redundancy. Additionally, the identifying of I/O channels may further comprise generating unique addresses for each of the I/O channels.

Operation 504 illustrates grouping the I/O channels into logical sets, wherein each logical set comprises I/O channels attached to a same virtual endpoint. In an embodiment, the virtual endpoint may be a Layer 2 network device.

Operation 506 illustrates, for each logical set, mapping each I/O channel to a physical channel such that no two channels in a logical set are connected to the same physical channel. In an embodiment, the mapping operation may further comprise identifying a physical endpoint that an I/O channel is configured to connect with and determining which network devices provide connectivity with the physical endpoint.

Operation 508 illustrates representing each logical set for the virtual machine as a single configuration entity such that an operating system of the virtual machine is allowed to expose I/O routing information to the attached virtual endpoint. In an embodiment, this may be facilitated by one or more software components, or integration components, configured by the virtualization system and executing in conjunction with the virtual machine.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method for configuring a virtual machine by a virtualization system, comprising:

receiving input/output (I/O) configuration information for the virtual machine and, based on the I/O configuration information, identifying I/O channels associated with the virtual machine;

grouping the I/O channels into logical sets, wherein each logical set comprises I/O channels attached to a same virtual endpoint;

for each logical set, mapping each I/O channel to a physical channel such that no two channels in a logical set are connected to a same physical channel; and representing each logical set as a single configuration entity such that an operating system of the virtual machine is allowed to expose I/O routing information to the attached virtual endpoint.

2. The method as recited in claim 1 wherein said virtual endpoint is a Layer 2 network device.

3. The method as recited in claim 1 wherein said representing is performed by at least one software component configured by the virtualization system and executing in conjunction with said virtual machine.

4. The method of claim 3 wherein said representing further comprises configuring multi-path I/O storage drivers within a guest operating system, wherein the I/O storage drivers represent multiple storage interfaces as a single logical interface.

5. The method of claim 4 further comprising configuring a load balancing and failover mechanism within the guest operating system.

6. The method as recited in claim 1 wherein said I/O configuration information comprises a level of path redundancy.

7. The method as recited in claim 1 wherein said identifying comprises generating unique addresses for each of the I/O channels.

8. The method as recited in claim 7 further comprising managing quality of service for each logical set as a whole.

9. The method of claim 7 further comprising configuring network assets to respond to the I/O channels.

10. The method of claim 1 wherein said mapping further comprises identifying a physical endpoint that an I/O channel is configured to connect with and determining which network devices provide connectivity with the physical endpoint.

11. The method of claim 10 further comprising generating an exclusivity rule for each logical set that indicates that each I/O channel in the logical set must map to unique physical interfaces.

12. The method of claim 11 further comprising binding each I/O channel in each logical set to a unique physical interface.

13. The method of claim 1 wherein, for iSCSI I/O channels, said representing further comprises loading tables in BIOS/firmware that identify NICs associated with a iSCSI boot device.

14. The method of claim 1 further comprising implementing a failover mechanism for failed physical channels.

15. The method of claim 14 wherein said failover mechanism comprises:

when one of the physical channels fail, reassigning a logical port associated with the failed channel to an unassigned physical channel in the same logical set.

16. The method of claim 15 wherein when no unassigned physical channels remains, a corresponding logical channel is placed offline.

17. A computer-readable storage medium having stored thereon computer-readable instructions that upon execution cause a configuring of a virtual machine, the computer-readable instructions comprising instructions that upon execution cause:

receiving input/output (I/O) configuration information for the virtual machine and, based on the I/O configuration information, identifying I/O channels associated with the virtual machine;

grouping the I/O channels into logical sets, wherein each logical set comprises I/O channels attached to a same virtual endpoint;

for each logical set, mapping each I/O channel to a physical channel such that no two channels in a logical set are connected to a same physical channel by generating an exclusivity rule for each logical set that indicates that each I/O channel in the logical set must map to unique physical interfaces; and representing each logical set as a single configuration entity such that an operating system of the virtual machine is allowed to expose I/O routing information to the attached virtual endpoint.

18. The computer-readable storage medium as recited in claim 17 wherein said representing is performed by at least one software component configured by the virtualization system and executing in conjunction with said virtual machine.

19. A system for configuring a virtual machine, comprising:

a computing device comprising at least one processor;

a memory communicatively coupled to said processor when said system is operational; said memory having stored therein computer instructions that upon execution by the at least one processor cause:

receiving input/output (I/O) configuration information for the virtual machine and, based on the I/O configuration information, identifying I/O channels associated with the virtual machine;

grouping the I/O channels into logical sets, wherein each logical set comprises I/O channels attached to a same virtual endpoint;

for each logical set, mapping each I/O channel to a physical channel such that no two channels in a logical set are connected to a same physical channel;

binding each I/O channel in each logical set to a unique physical interface; and representing each logical set as a single configuration entity such that an operating system of the virtual machine is allowed to expose I/O routing information to the attached virtual endpoint.

20. The system as recited in claim 19 wherein said I/O configuration information comprises a level of path redundancy.

\* \* \* \* \*